US009799363B2

(12) United States Patent
Chen et al.

(10) Patent No.: US 9,799,363 B2
(45) Date of Patent: Oct. 24, 2017

(54) DAMPING CONTROLLED COMPOSITE MAGNETIC MEDIA FOR HEAT ASSISTED MAGNETIC RECORDING

(71) Applicant: Seagate Technology LLC, Cupertino, CA (US)

(72) Inventors: Xi Chen, Fremont, CA (US); Yingguo Peng, San Ramon, CA (US); Jan-Ulrich Thiele, Sunnyvale, CA (US); Ganping Ju, Pleasanton, CA (US); Thomas Roscamp, Kihei, HI (US)

(73) Assignee: SEAGATE TECHNOLOGY, LLC, Cupertino, CA (US)

( * ) Notice: Subject to any disclaimer, the term of this patent is extended or adjusted under 35 U.S.C. 154(b) by 610 days.

(21) Appl. No.: 13/802,354

(22) Filed: Mar. 13, 2013

(65) Prior Publication Data
US 2014/0272473 A1    Sep. 18, 2014

(51) Int. Cl.
*G11B 5/65* (2006.01)
*G11B 5/716* (2006.01)
*G11B 5/68* (2006.01)
*G11B 5/66* (2006.01)

(52) U.S. Cl.
CPC ............ *G11B 5/716* (2013.01); *G11B 5/65* (2013.01); *G11B 5/66* (2013.01); *G11B 5/68* (2013.01)

(58) Field of Classification Search
CPC .. G11B 5/68; G11B 5/716; G11B 5/65; G11B 5/66
See application file for complete search history.

(56) References Cited

U.S. PATENT DOCUMENTS

| 7,773,331 | B2 | 8/2010 | Akagi et al. |
| 8,658,292 | B1* | 2/2014 | Mallary et al. ............... 428/828 |
| 2007/0003792 | A1 | 1/2007 | Covington et al. |
| 2008/0212241 | A1 | 9/2008 | Schabes |
| 2011/0043943 | A1 | 2/2011 | Igarashi et al. |
| 2012/0154948 | A1* | 6/2012 | Tamai et al. .................... 360/75 |
| 2013/0004796 | A1 | 1/2013 | Peng et al. |

FOREIGN PATENT DOCUMENTS

EP    1146507    10/2001

OTHER PUBLICATIONS

Mills et al., "Spin Damping in Ultrathin Magnetic Films", Topics Appl. Phys., vol. 87, 2003, pp. 27-59.
Shiiki et al., "Magnetization Process of Heat Assisted Magnetic Recording by Micro-magnetic Simulation", Journal of Physics: Conference Series 200, 2010, pp. 1-4.
International Search Report and Written Opinion dated May 6, 2014 for PCT Application No. PCT/US2014/019265, 10 pages.

* cited by examiner

*Primary Examiner* — Holly Rickman
*Assistant Examiner* — Linda Chau
(74) *Attorney, Agent, or Firm* — Hollingsworth Davis, LLC (57) ABSTRACT

A magnetic stack includes a substrate and a magnetic recording layer disposed over the substrate. The magnetic recording layer comprises magnetic crystalline grains and a segregant disposed between grain boundaries of the crystalline grains. One or both of the magnetic crystalline grains and the segregant are doped with a rare earth or transition metal dopant in an amount that provides the magnetic recording layer with a magnetic damping value, $\alpha$, between about 0.1 to about 1.

19 Claims, 9 Drawing Sheets

*Fig. 9* emu/cc

*Fig. 10A* emu/cc

DAMPING CONTROLLED COMPOSITE MAGNETIC MEDIA FOR HEAT ASSISTED MAGNETIC RECORDING

SUMMARY

Embodiments discussed below involve a magnetic stack that includes a substrate and a magnetic recording layer disposed over the substrate. The magnetic recording layer includes magnetic crystalline grains and a segregant disposed between grain boundaries of the crystalline grains. One or both of the magnetic crystalline grains and the segregant are doped with a rare earth or transition metal dopant in an amount that provides the magnetic recording layer with magnetic damping value, $\alpha$, between about 0.1 to about 1.

Some embodiments are directed to a magnetic stack comprising a substrate and a magnetic recording layer disposed over the substrate. The magnetic recording layer includes a first magnetic recording sublayer comprising first magnetic crystalline grains and a first segregant disposed between grain boundaries of the crystalline grains. The magnetic recording layer also includes a second magnetic recording sublayer including second magnetic crystalline grains and a second segregant disposed between grain boundaries of the second magnetic crystalline grains. One or both of the first magnetic crystalline grains and the first segregant are doped with a rare earth or transition metal dopant in an amount that provides the magnetic recording layer with an overall damping value, $\alpha$, between about 0.1 to about 1.

BRIEF DESCRIPTION OF THE DRAWINGS

The discussion below makes reference to the following figures, wherein the same reference number may be used to identify the similar/same component in multiple figures.

DETAILED DESCRIPTION

Higher areal density for magnetic recording can be achieved by decreasing the size of magnetic grains used for magnetic recording media. As grain sizes with a given magnetic anisotropy energy decrease in volume, eventually a thermal stability limit is reached at which random thermally driven magnetic fluctuations at room temperature result in magnetization reversal and corresponding loss of data reliability. To increase the thermal stability limit, materials having higher magnetic anisotropy energy at room temperature can be used to form the magnetic grains. However, higher anisotropy particles require a correspondingly higher write field to change the magnetization orientation of the particles. Writing data to very high magnetic anisotropy materials may necessitate the use of some type of energy assistance to temporarily reduce the magnetic anisotropy energy of the materials while the magnetic write field is applied.

Heat assisted magnetic recording (HAMR) can increase storage density in hard disk drives significantly. The HAMR process involves heating the magnetic media, e.g., to a temperature near the Curie temperature, $T_c$. The heated media is subsequently cooled in the presence of a magnetic field from the recording head, whose orientation encodes the data to be stored. By reducing the anisotropy K of the magnetic media at high temperature, HAMR makes it possible to record data on high K magnetic material.

In order to record data, the head field from the writer is applied to switch the magnetization to the desired direction. In HAMR, this is achieved by first heating the grain to a temperature in the vicinity of $T_c$ and then cooling the grain in the presence of the head field. If it is assumed that the magnetization is in thermal equilibrium all the time, then probability of successful switching is: $\exp(Ms*H*V/k_B*T)/(\exp(Ms*H*V/k_B*T)+\exp(-Ms*H*V/k_B*T))$ as described by Boltzmann statistics. For a FePt magnetic crystalline grain of grain size 6 nm, Ms=500, H=10 kOe, this translates to a switching error rate of $10^{-23}$ at 300K or room temperature, which can be safely ignored.

However, the equilibrium assumption stated in the paragraph immediately above requires that the recording time scale is much larger than the Neel relaxation time of the grain, which is only true at temperature higher than $T_B$. Neel relaxation time determines the rate at which the system relaxes to thermal equilibrium that obeys Boltzmann distribution and it generally increases exponentially with lower temperature. In order to achieve a designed probability of successful switching, a faster relaxation time is helpful. The magnetic damping parameter ($\alpha$), is a dimensionless parameter that characterizes the dissipation rate of magnetic energy. It is one factor that determines the relaxation time of a magnetic layer. A higher value for magnetic damping parameter corresponds to increased damping in magnetic recording layers which in turn leads to faster relaxation, less noise and higher signal-to-noise ratio (SNR).

Embodiments herein involve magnetic recording layers useful for heat assisted magnetic recording designed to have a value for the magnetic damping parameter ($\alpha$) greater than 0.1, or in a range of about 0.1 to about 1. By controlling the magnetic damping of the magnetic recording layer, the dissipation rate of the magnetic energy in the layer can thereby be controlled. Controlling the dissipation rate of the magnetic energy can provide a relaxation time of the magnetic grains that achieves specified noise and SNR characteristics.

In some configurations discussed herein, the specified value of the magnetic damping parameter of a magnetic recording layer is achieved by adding dopants to the magnetic recording layer. In some configurations, the specified value of the magnetic damping parameter is achieved by controlling the width of the segregant region between magnetic grains of a granular two-phase magnetic recording layer. Some configurations rely on both segregant thickness and doping to achieve a specified damping parameter value for a magnetic recording layer. As used herein, the term "magnetic recording layer" can include a single magnetic layer or multiple magnetic sublayers. When multiple magnetic sublayers are used, the overall damping parameter of the magnetic recording layer is a combination of the damping parameters of the magnetic sublayers. The magnetic recording layer may include one or more of a first group of one or more magnetic sublayers that have damping parameter values predominantly (e.g., at least 75%) influenced by doping of the sublayer, a second group of one or more undoped magnetic sublayers that have damping parameter values predominantly influenced by thickness of the segregant between the grain boundaries, and a third group of one or more magnetic sublayers that have damping parameter values influenced by both doping and the segregant thickness.

Figure 1:
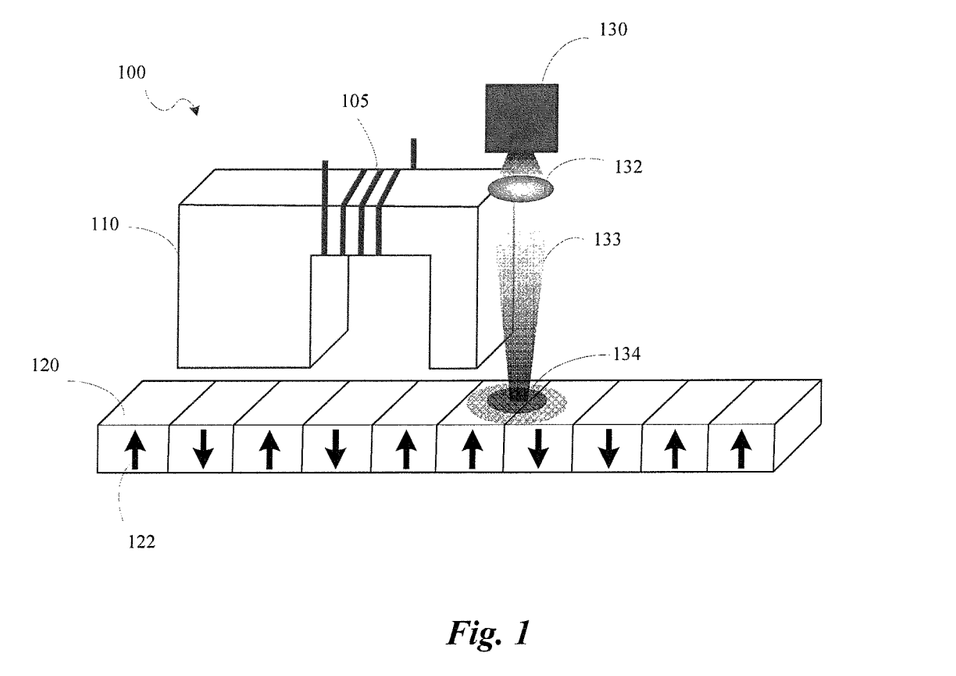
FIG. 1 is a diagram of a heat assisted magnetic recording system writing to magnetic recording media having a damping controlled magnetic recording layer in accordance with embodiments described herein.

FIG. 1 provides a general diagram of a HAMR system 100 writing to magnetic recording medium 120. In HAMR system 100, information bits 122 are recorded in a storage layer at elevated temperatures in specially configured magnetic mediums (e.g., 120). The use of heat can overcome superparamagnetic effects that might otherwise limit the areal data density of the media. As such, HAMR system 100 may launch electromagnetic energy 133 from a light source 130, such as a laser diode, to heat a small confined area 134 of the magnetic recording medium 120. The energy 133 may be directed through integrated optics 132, such as waveguides and focusing elements, as well as, concentrating elements, including near-field transducers (NFT), in order to heat the small confined area 134 of the magnetic recording medium 120. A magnetic recording head 110 applies a magnetic field H produced by current from coils 105 to record information to the small confined area 134 that is being heated by energy 133. The information is recorded to the magnetic medium 120 by controlling the direction of magnetization of bits 122 in the confined area 134.

Heat assisted magnetic recording introduces sources of media noise that are non-existent or negligible in non-heat assisted magnetic recording. One such noise source is thermodynamic noise due to thermal fluctuations when the magnetic grains are cooled down from $T_c$ to room temperature. Thermodynamic noise can lead to bits that are switched to an unintended state during the cooling process. As the medium cools, the magnetic grains are subject to significant thermal fluctuation and a fraction of grains will not end up aligned with the field direction. As the grains go through a blocking temperature $T_B$, their magnetic states stabilize and their orientations "freeze in". The grains that are not aligned with the recording head field will be frozen into the wrong orientation which will result in thermodynamic noise. This thermodynamic noise can manifest in the magnetic recording layer as media DC noise as well as transition jitter.

As discussed herein, noise and transition jitter of the magnetic medium 120 can be mitigated by controlling the amount of magnetic damping of the magnetic recording layer of the medium 120. The magnetic medium 120 shown in FIG. 1 incorporates a magnetic recording layer comprising a single layer or multiple sublayers, at least some of which are damping controlled as illustrated by the various embodiments provided below.

Figure 2:
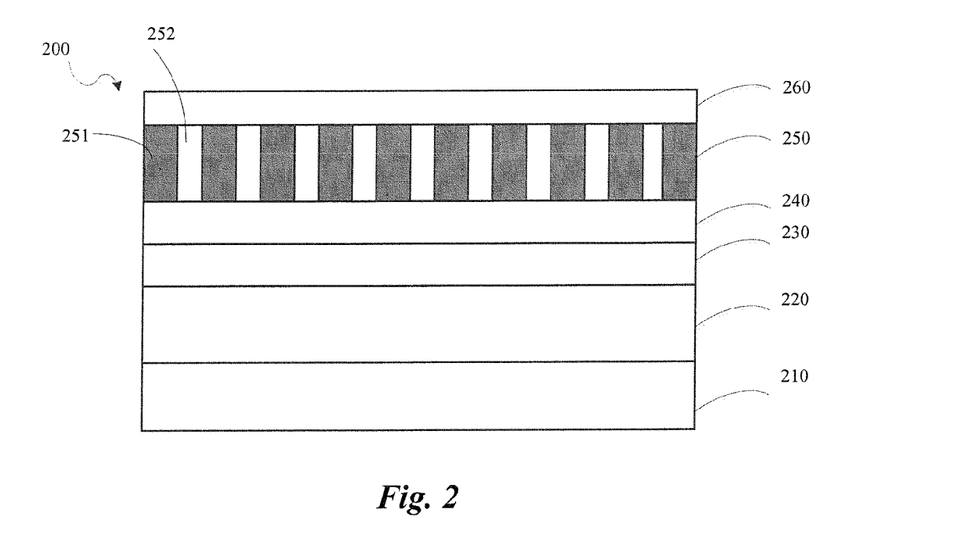
FIG. 2 shows a top view of a magnetic recording layer in accordance with some embodiments.

FIG. 2 shows a magnetic stack 200 useful for heat-assisted magnetic recording media that includes a magnetic recording layer with dopant-controlled magnetic damping. The stack 200 includes a substrate 210 (e.g., ceramic glass, amorphous glass, Si, Sapphire, high temperature aluminum, or NiP coated AlMG), and may include a soft magnetic underlayer (SUL) 220. If a SUL 220 is used, the SUL can be configured to enhance the magnetic write field by providing a return path for magnetic flux produced by the magnetic field during a write operation of the magnetic recording head. The SUL 220 may comprise one or more layers of amorphous and/or crystalline materials. Typical SUL materials may comprise Fe, Co, B, Ta, Zr, Cr, and Nb. The stack 200 optionally includes one or more seedlayers, such as seedlayer 230 (e.g., Ta), disposed on the SUL 220 and/or other layers of the stack, which facilitates orienting the crystalline grain structures of proximate layers. A thermal control layer 240 may be disposed on the seedlayer 230 or elsewhere in the stack. The thermal control 240 layer may be used to control the flow of heat created during heat assisted write operations. Typical thermal control layer 240 materials comprise Cu, Ag, Al, Au, Ni, Mo, W, V, Ru and/or alloys such as CuZr and CuNi, or any alloys of these elements. The stack 200 may include a protective overcoat layer 260. An overcoat layer 260 may include a diamond-like carbon coating. Moreover, various interlayers, adhesion layers, spacer layers, exchange break layers, heat sinks, diffusion barriers, grain segregation control layers, orientation layers and the like may optionally be disposed between layers of the stack 200.

In the example shown in FIG. 2, the magnetic recording layer 250 includes at least one layer that has a two-phase granular structure. The granular two-phase magnetic recording layer 250 includes a primary phase 251, comprising crystalline magnetic grains, and a secondary phase 252, known as a segregant, disposed between the grain boundaries of the crystalline grains 251.

Figure 3:
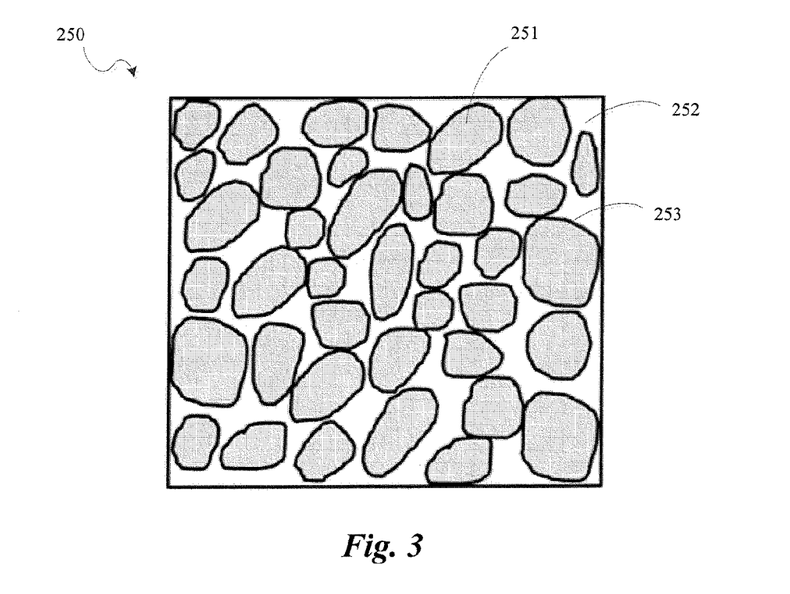
FIG. 3 is a cross-sectional view of a magnetic stack having a damping controlled magnetic recording layer in accordance with some embodiments.

FIG. 3 illustrates top view of the magnetic recording layer 250 shown in FIG. 2. FIG. 3 illustrates the magnetic crystalline grains 251 separated by a segregant material 252 disposed between grain boundaries 253 of the magnetic grains 251. For example, in various embodiments, the magnetic crystalline grains 251 may comprise FePt, FeXPt alloy, $Co_3Pt$, CoXPt alloy, CoX/Pt multilayer, CoXPd alloy, CoX/Pt multilayer, or TbFeCo. In some embodiments, the magnetic crystalline grains 251 comprise substantially ordered $L_{10}$ FePt alloy. The segregant 252 of the magnetic recording layer may be nonmagnetic and/or may be amorphous. The segregant 252 may comprise one or more of C, $SiO_2$, $Al_2O_3$, $Si_3N_4$, BN, $WO_3$, $Ta_2O_5$, $HfO_2$, $ZrO_2$, or another oxide, nitride, boride, or carbide material. As discussed in more detail herein, the doping of the grains 251 and/or doping of the segregant 252 and/or the thickness of the regions of segregant 252 disposed between the grain boundaries 253 can be used to control the amount of magnetic damping of the magnetic recording layer 250.

Typical magnetic materials used as recording media for HAMR applications, such as FePt, may have a small intrinsic magnetic damping parameter value less than about 0.05 as measured in an epitaxial thin film. The value of the magnetic damping parameter for a magnetic recording layer can be modified by doping the magnetic grains and/or the segregant in a two-phase recording layer with rare earth element and/or transition element atoms. Depending on the dopant, the magnetic damping effect achieved by addition of the dopants may be particularly large for some rare earth elements. For example, it has been shown that a 10 at. % doping of the rare earth element Tb in a magnetic recording layer comprising NiFe may increase the magnetic damping parameter by two orders of magnitude. The 4f rare earth elements (Tb, Ho, Sm, Dy, Os, Ir, Nd, Pr, Er, Tm and Gd) and/or 3d, 4d and/or 5d transition elements such as (Ti, V, Cr, Mn, Cu, Zr, Nb, Mo, Ru, Rh, Pd, Ta, W, Re, Os, Ir, Au), may be used to increase the magnetic damping parameter of a magnetic layer.

In some embodiments, the amount of magnetic damping, as indicated by the value of the magnetic damping parameter, $\alpha$, of the magnetic layer is controlled by adding dopants into the magnetic grains. In other embodiments, the dopants are added to the segregant between the magnetic grains. In some embodiments, the dopants that control the magnetic damping parameter are added to both the segregant and the magnetic grains. As previously explained, as used herein, the term "magnetic recording layer" can refer to a single magnetic layer or multiple magnetic sublayers. Thus, in cases wherein the magnetic recording layer includes multiple sublayers, the dopant may be added to one, some, or all of the sublayers of the magnetic recording layer.

As indicated above, the dopants may include one or more 4f rare earth elements (Tb, Ho, Sm, Dy, Os, Ir, Nd, Pr, Er, Tm and Gd) and/or 3d, 4d and/or 5d transition elements such as (Ti, V, Cr, Mn, Cu, Zr, Nb, Mo, Ru, Rh, Pd, Ta, W, Re, Os, Ir, Au). The amount of the dopant added to the magnetic grains and/or the segregant may be on the order of about 2 at. % to about 10 at. %. Doping at this level can provide a magnetic damping parameter, $\alpha$, in the magnetic recording layer of about 0.1 to about 1.

The doping at these levels causes a decrease in the anisotropy field, Hk, of the doped magnetic recording layer. The doping is controlled so that the anisotropy field, Hk, in the doped layer is decreased by less than about 50% and/or between about 10% to about 50% when compared to an anisotropy field of a similar magnetic recording layer that is not doped with the rare earth or transition metal dopants.

In addition to decreasing the anisotropy field of the doped layer, in some situations, the addition of rare earth and/or transition dopants may be associated with corrosion of the magnetic recording layer and/or changes in the magnetization saturation, and/or the Curie temperature (Tc). In some embodiments, Tc of the magnetic layer may be decreased by about 10% to about 30% when compared to a similar undoped layer. This decrease in Tc may serve to enhance HAMR system reliability. Lower Tc requires less laser power requirement, and may lead to an extended HAMR head lifetime.

Some of the impacts of doping may be offset by fabricating magnetic recording layers having two or more magnetic recording sublayers with different levels of doping. In one example, one or more magnetic recording sublayers of the magnetic recording layer may be doped and another one or more magnetic recording sublayers of the magnetic recording layer may be undoped. In another example, one or more magnetic recording sublayers may have a relatively higher value of a (and lower value of Hk) and one or more magnetic recording sublayers may have a relatively lower value of a (and higher value of Hk). A possible implementation of such concept is to deposit a number of magnetic recording sublayers, N, where $2 \leq N \leq 10$ wherein the magnetic damping parameter of each sublayer is controlled to a specified value. The magnetic recording sublayers can be arranged in the stack so that the sublayers with relatively higher values of the magnetic damping parameter are protected from corrosion at least to some extent. For example, one or more magnetic recording sublayers of the magnetic recording layer having relatively higher damping parameter values and higher values of Hk may be disposed between the substrate and one or more magnetic recording sublayers of the magnetic recording layer having relatively lower damping parameter values and lower values of Hk.

As previously discussed, in a magnetic recording layer that includes multiple sublayers, the value of the damping parameter of each sublayer can contribute to the overall damping parameter value of the multi-sublayer magnetic recording layer. The amount of the doping material added to each sublayer may be varied in such a way as to configure the overall damping parameter value of the magnetic recording layer to be greater than about 0.1 or in a range of about 0.1 to about 0.6, or in a range of about 0.1 to about 1, for example. The use of the multiple sublayer structure for the magnetic recording layer allows tuning of the overall magnetic damping parameter value for the magnetic recording layer that provides optimal performance. Furthermore, because magnetization energy in the higher magnetic damping sublayers dissipates faster than the magnetization energy in the lower magnetic damping sublayers during the cooling stage of the write process, the multi-layer recording layer can be arranged so that the higher magnetic damping sublayer helps to stabilize the magnetic grains of the lower magnetic damping sublayer through vertical exchange coupling of the sublayers. The higher damped sublayer can be above or below the lower damped sublayer. An exchange break layer may be disposed between the higher damped and lower damped sublayers. Even in the presence of the exchange break layer, the higher and lower damped sublayers are still partially exchange coupled and the higher damped layer would help to stabilize the lower damped layer.

In configurations in which a single magnetic recording layer is used, the damping in the magnetic recording layer may be varied as a function of distance along an axis normal to the surface of the magnetic recording layer. As such, the lower portion of the single magnetic recording layer (closer to the substrate) may be more heavily doped (and have a correspondingly higher value of the damping parameter) than an upper portion. Furthermore, in magnetic recording layers that include multiple sublayers, the doping in one or more of the sublayers may vary with distance along the surface normal axis.

Figure 4:
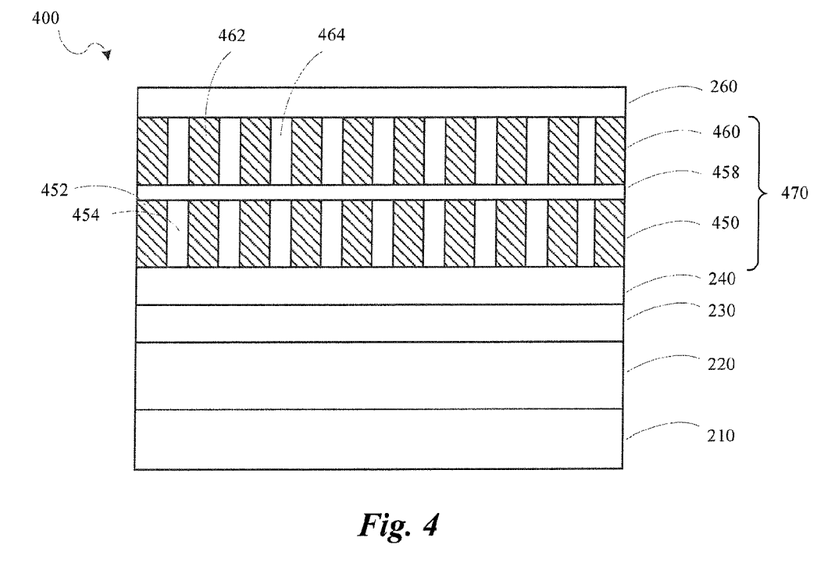
FIG. 4 is a cross-sectional view of a magnetic stack utilizing a bilayer structure in accordance with some embodiments.

FIG. 4 is an example of a possible implementation of a magnetic stack 400 that includes a multiple sublayer magnetic recording layer 470 with dopant-controlled damping. The magnetic stack 400 of FIG. 4 comprises a substrate 210 and an optional SUL 220, seedlayer 230, thermal control layer 240, and overcoat layer 260 and/or other layers which may be similar to those previously discussed in connection with FIG. 2. The magnetic recording layer 470 includes a first magnetic recording sublayer 450, an optional spacer layer 458, and a second magnetic recording sublayer 460. In this example, the magnetic recording sublayers 450, 460 are granular two-phase layers, wherein each sublayer 450, 460 comprises magnetic crystalline grains 452, 462 separated by a segregant 454, 464 disposed between the magnetic crystalline grains 452, 462. In some configurations, the magnetic grains 452 of the first sublayer 450 may comprise the same materials as the magnetic grains 462 of the second sublayer 460; the segregant 454 of the first sublayer 450 may comprise the same materials as the segregant 462 of the second sublayer 460. In some configurations, the magnetic grains 452 and/or segregant 454 of the first sublayer 450 may comprise different materials than the magnetic grains 462 and/or segregant 464 of the second sublayer 460.

The damping parameter value, $\alpha$, of the magnetic recording layer 470 is a function of the damping parameter values of its constituent sublayers 450, 460 weighted by the thickness of the sublayers 450, 460. The damping parameter values, $\alpha_1$ for the first sublayer 450, and $\alpha_2$ for the second sublayer 460, can be controlled by doping with rare earth or transition elements in an amount of about 2 at. % to about 10 at. %. Doping at these levels in the sublayers 450, 460 can provide an overall magnetic damping parameter, $\alpha$, in the magnetic recording layer 470 of about 0.1 to about 1. The doping of the sublayers 450, 460 at these levels causes a decrease in the anisotropy field, Hk, of the doped magnetic recording sublayers 450, 460. The doping is controlled so that the anisotropy field Hk of each of the sublayers 450, 460 decreases by less than about 50% and/or between about 10% to about 50% when compared to an anisotropy field of a similar magnetic recording sublayer that is not doped with the rare earth or transition metal dopants.

In some implementations, the first sublayer 450 includes an amount of rare earth and/or transition element doping that is different from the amount of rare earth and/or transition element doping of the second sublayer 460. In some implementations, the magnetic crystalline grains 452 and/or segregant 454 of the first sublayer 460 are doped with rare earth and/or transition elements and the second sublayer 460 includes no rare earth and/or transition element doping (No doping means that only a trace, non-functional amount of these elements would be present in the sublayer). In cases where one sublayer includes a smaller amount of rare earth/transition element doping than another sublayer, corrosion resistance of the more heavily doped sublayer may be enhanced when the less heavily doped sublayer is disposed over and/or directly on the more heavily doped sublayer. As such, the more heavily doped sublayer would be arranged lower in the magnetic stack, i.e., closer to the substrate.

As discussed above, the doping of one of the sublayers, e.g., first sublayer 450, imparts a magnetic damping parameter, $\alpha_1$, in the first sublayer 450 that is higher than the magnetic damping parameter, $\alpha_2$, in another of the sublayers, e.g., second sublayer 460. The use of the multi-layer magnetic recording layer 470 where the first sublayer 450 has a magnetic damping parameter value that is different from the magnetic damping parameter value of the second sublayer 460 provides an overall damping parameter value, $\alpha$, for the magnetic recording layer 470 that is a function of the values of the damping parameters of the first and second sublayers 450, 460, $f(\alpha_1, \alpha_2)$. In some cases $f(\alpha_1, \alpha_2)$ may be an average of the $\alpha$ of the two layers weighted by the thickness of the layers.

The use of multiple sublayers with different values of the damping parameter allows the magnetic damping parameter of the magnetic recording layer 470 to be tuned to a specified overall value that provides optimal performance of the magnetic recording media. In some cases, as shown in FIG. 4, the magnetic recording layer 470 includes a spacer layer 458. The thickness and/or composition of the spacer layer may be selected to provide a predetermined amount of overall damping and/or to provide a predetermined amount of vertical exchange coupling for the magnetic recording layer 470.

Although FIG. 4 illustrates a magnetic recording layer having two sublayers 450, 460 that may comprise different amounts of doping, it will be appreciated that any number of magnetic sublayers, some of which have rare earth/transition element doping levels that differ from the rare earth/transition element doping levels of other sublayers, may be included in a magnetic stack. In some configurations, the magnetic stack may not have identifiable sublayers with distinctly different rare earth/transition element doping levels. In these configurations the level of the rare earth and/or transition element doping in at least a portion of the magnetic recording layer may vary continuously along the axis normal to the surface of the magnetic recording layer. In continuously graded implementations, the magnetic grains, the segregant, or both may have a continuously varying level of doping with rare earth and/or transition elements.

The two magnon scattering phenomenon that occurs at the grain boundaries of granular two-phase magnetic layers can be a source of magnetic damping in a magnetic recording layer. Lateral magnetic exchange coupling between adjacent magnetic grains in a magnetic layer is attenuated by the segregant regions in between grains. More exchange decoupled magnetic layers that have more scattering sites at the grain boundaries tend to have larger damping parameter values. Thus, the damping parameter value and the exchange decoupling of a two-phase magnetic recording layer may be jointly controlled by adjusting the thickness of the segregant regions at the boundaries between the grains.

Figure 5:
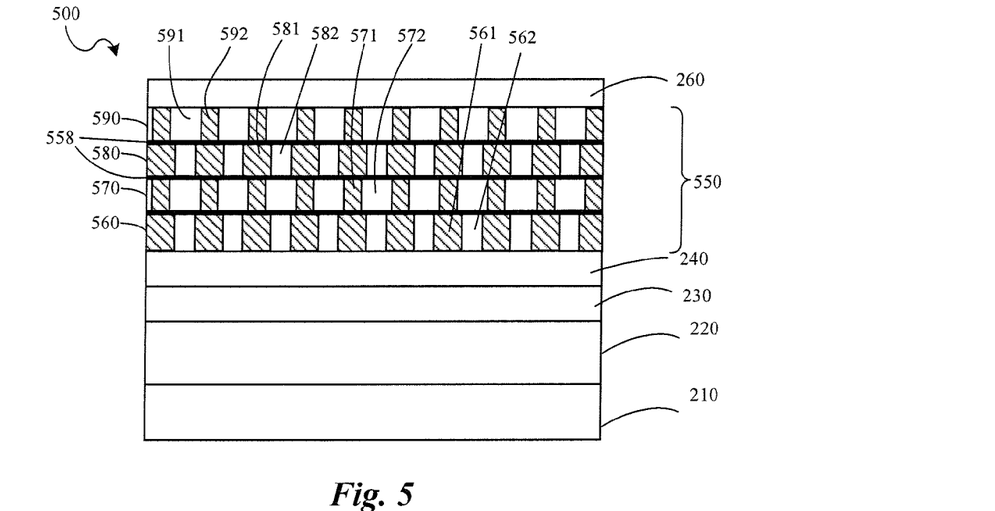
FIG. 5 is a cross-sectional view of a magnetic stack having a damping controlled magnetic recording layer using alternating higher and lower exchange decoupled sublayers in accordance with some embodiments.

FIG. 5 is a diagram of a magnetic stack 500 comprising a magnetic recording layer 550 that includes multiple two-phase granular magnetic recording sublayers 560, 570, 580, 590 in accordance with some embodiments. Although four sublayers are shown in FIG. 5, it will be appreciated that in general N sublayers may be included in the magnetic recording layer 550. For example, in some cases, $2 \leq N \leq 10$. In addition to the magnetic recording layer 550, the stack 500 of FIG. 5 includes a substrate 210, and optionally includes SUL 220, seedlayer 230, thermal control layer 240, and an overcoat layer 260 similar to those layers previously discussed. Each of the N sublayers 560, 570, 580, 590 may optionally be separated by a spacer layer 558 which can serve to further control the vertical magnetic exchange coupling between the sublayers 560, 570, 580, 590 and/or the vertical interaction of the sublayer damping parameters.

The granular sublayers 560, 570, 580, 590 include magnetic crystalline grains 561, 571, 581, 591 and segregant 562, 572, 582, 592 disposed between the magnetic crystalline grains 561, 571, 581, 591. Each of the granular sublayers 560, 570, 580, 590 has a damping parameter value $\alpha_n$, where n=1, 2, 3 . . . N (N=4 in FIG. 5). The damping parameter value of at least one of the sublayers, e.g., sublayers 560, 580 is greater than the damping parameter value of other sublayers, e.g., sublayers 570, 590. In some cases, the difference in the damping parameter values in the sublayers 560, 570, 580, 590 is due to the variation in the amount of segregant between the magnetic grains. As previously discussed, magnetic sublayers that have thicker segregant regions between the grains, such as sublayers 560 and 580, have more sites that contribute to two magnon scattering, resulting in higher damping.

The overall value of the damping parameter for a magnetic recording layer is determined by the damping parameters of the constituent magnetic sublayers of the magnetic recording layer. As such, a specified overall damping parameter value can be achieved by controlling the amount or thickness of segregant between the sublayer grains. For example, in some embodiments, the thickness of the segregant 561, 571, 581, 591 of one or more of the sublayers 560, 570, 580, 590, respectively, may be controlled to provide a damping parameter value for the magnetic recording layer between about 0.1 to about 1. For example, in typical FePt media, with damping on the order of about 0.05, the thickness of the segregant may be about 0.25 to about 1 nm. For damping values between 0.1 to about 1, the damping values may be 1.5 to 3 times higher than these typical values. Thus, the damped sublayers that have relatively higher exchange decoupled sublayers in the magnetic recording layer (such as sublayers 570, 590) can have damping parameter value(s) of about 1 imparted predominantly by a segregant thickness of about 3 nm. The damped sublayers that have relatively lower exchange decoupled sublayers of the magnetic recording layer (such as sublayers 560, 580) can have damping parameter value(s) of about 0.1 imparted predominantly by a segregant thickness of about 1.5 nm.

The value of the overall damping parameter can be fine-tuned using a number of sublayers that have higher 570, 590 and lower 560, 580 exchange decoupled layers. In some embodiments, at least some of the sublayers of the magnetic recording layer may be substantially undamped by either doping or segregant thickness. These undamped layers would have a damping parameter value less than 0.1 (undamped). The magnetic recording layer may include some sublayers that are damped (damping parameter value greater than 0.1) and some sublayers that are undamped (damping parameter value less than 0.1). The layer thicknesses and segregant thicknesses of the sublayers can be controlled to achieve an overall damping parameter value for the magnetic recording layers between about 0.1 and 1.

In some configurations, the amount of magnetic damping in the magnetic recording layer can be controlled by a combination of both the two magnon scattering phenomenon related to exchange decoupling (as provided by the segregant thickness between grains) and doping with rare earth and/or transition elements. A magnetic stack 600 shown in FIG. 6 includes a magnetic recording layer 650 having sublayers 660, 670, 680, 690. In the example stack 600 shown in FIG. 6, some of the sublayers 660, 670 contribute to the overall damping of the magnetic recording layer 650 due to rare earth/transition element doping and some of the sublayers 680, 690 contribute to the overall damping of the magnetic recording layer 650 due to two magnon scattering at the grain boundaries.

In some cases, particularly for those sublayers with rare earth and/or transition element doping, the doping may be controlled so that a of the sublayer varies continuously or step-wise along an axis normal to the plane of the magnetic recording layer. In doped sublayers the variation in a may be accomplished by varying an amount of dopant in the sublayer.

Figure 6:
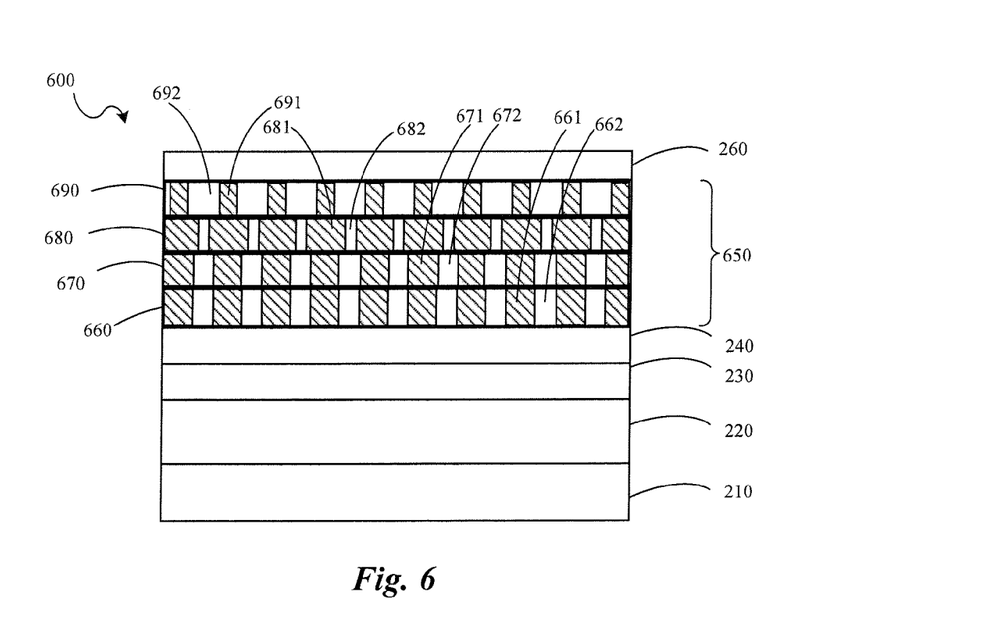
FIG. 6 is a cross-sectional view of a magnetic stack with a multi-layer magnetic recording layer having alternating doping levels and alternating levels of exchange decoupling in granular sublayers in accordance with some embodiments.

In the example stack 600 shown in FIG. 6, a first group of the sublayers 660, 670 have a magnetic damping parameter value predominantly controlled by the rare earth/transition element doping of one or more of the grains 661, 671 and segregant 662, 672 of the sublayers 660, 670. A second group of the sublayers 680, 690 have a magnetic damping parameter value predominantly controlled by the thickness of the segregant 682, 692 between the grains 681, 691.

In some implementations, the rare earth/transition element doping levels in the sublayers 660, 670 may be selected to achieve specified overall damping parameter value for these sublayers. According to some aspects, the level of rare earth/transition element doping in sublayer 660 may be greater than the rare earth/transition element doping level of sublayer 670. The thickness of the segregant 692 disposed between the magnetic grains 691 of magnetic sublayer 690 is less than the thickness of the segregant 682 disposed between the magnetic grains 681 of magnetic sublayer 680. Sublayer 690 is more exchange decoupled than sublayer 680 and provides a higher damping parameter value than sublayer 680. The segregant thicknesses of the sublayers 680, 690 may be selected to achieve specified overall damping parameter value for these sublayers.

Although four sublayers are shown in FIG. 6, it will be appreciated that more or less sublayers may be included in the magnetic stack. All or some of the sublayers of the magnetic recording layer may be doped with rare earth and/or transition elements in amounts that provide a damping parameter value controlled at least to some extent by the doping of the grains and/or segregant. Additionally or alternatively, all or some of the sublayers of the magnetic recording layer may have segregant thicknesses that provide a damping parameter value controlled at least to some extent by the thickness of the segregant that leads exchange decoupling and two magnon scattering at the grain boundaries.

Magnetic recording media may benefit from a balance of a number magnetic properties in the magnetic recording layer, including magnetic damping that achieves a specified dissipation rate of magnetic energy in the layer which may be characterized by damping parameter, $\alpha$; magnetic anisotropy that is sufficiently high to provide thermal stability; sufficiently low lateral magnetic exchange coupling among the magnetic grains to maintain a correlation length between magnetic grains or clusters that provides a specified areal density; sufficiently high lateral magnetic exchange coupling among the magnetic grains to maintain a sufficiently narrow switching field distribution (SFD) that provides a specified SNR; and sufficient uniformity of magnetic properties among the grains to maintain thermal stability and SFD.

The materials and/or configuration of the sublayers and/or the arrangement of the sublayers of a magnetic recording layer can be selected to provide a specified overall damping parameter value and may also be selected to provide a specified corrosion resistance, a specified amount of vertical magnetic exchange coupling, and/or to provide a specified amount of exchange spring interaction between magnetic sublayers that provides incoherent magnetic of one or more of the magnetic sublayers.

In various embodiments, the material composition and/or arrangement of sublayers in magnetic recording layers such as those set forth as examples herein may be used to impart one or more of the above characteristics to the magnetic layer in addition to providing an overall damping parameter according to specifications described herein. The materials and/or configurations may be selected to provide jointly optimal values for the parameters discussed above.

Figure 7:
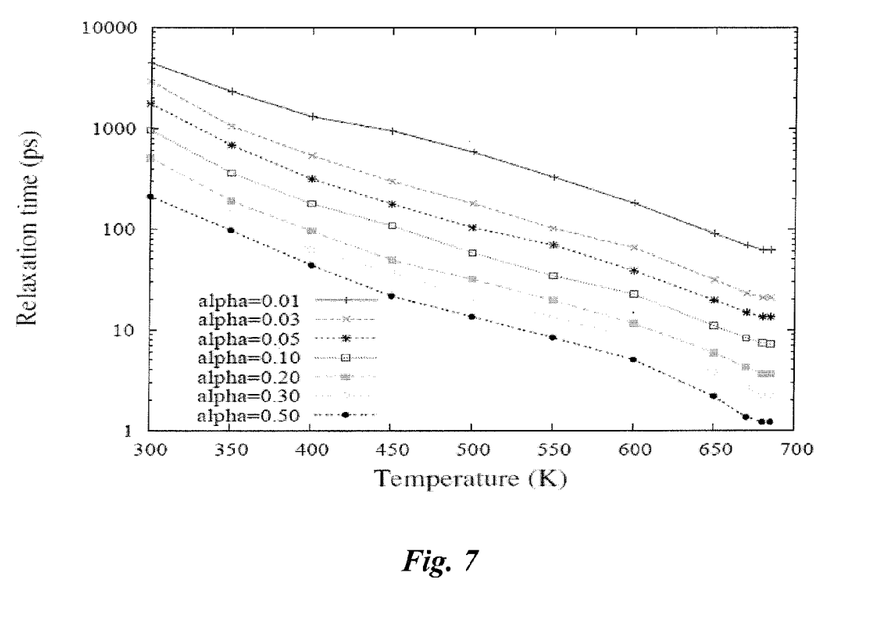
FIG. 7 is a graph showing relaxation times for various example magnetic damping parameters as a function of temperature.

FIG. 7 shows the calculation of a set of relaxation times for magnetic layers having different damping constant, $\alpha$, as a function of temperature. In this set of graphs, temperatures ranged 300K and 700K for damping constants ranging from about 0.01 to about 0.50 which simulates FePt media with different levels of doping ranging from 0% to 10%. FIG. 7 shows an exponential decrease in relaxation time with increasing temperature of the magnetic layer. Furthermore, the graph also shows that smaller magnetic damping constants are associated with decreased relaxation time. The effect of magnetic damping on relaxation time was calculated by extracting the zero-field relaxation at various temperatures and magnetic damping parameters, using a stochastic Landau-Lifshitz-Bloch (LLB) equation. The LLB approach was chosen over the conventional Landau-Lifshitz-Gilbert equation (LLG), because the LLB equation may provide a more accurate description of magnetodynamics at elevated temperature by capturing the torque and fluctuations in the longitudinal direction.

Figure 8:
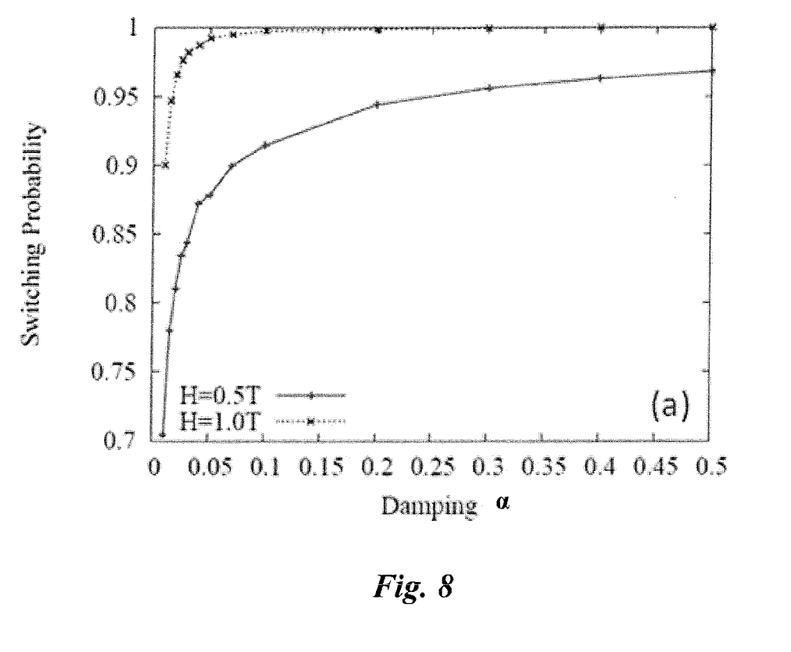
FIG. 8 is a graph showing switching probability as a function of example magnetic damping parameters.

FIG. 8 is a graph showing switching probability as a function of magnetic damping parameters ($\alpha$) for magnetic head fields of 0.5T and 1.0T. The head fields were tested for a series of magnetic damping parameters ranging from about 0.01 to about 0.5. The graph in FIG. 8 shows that an increase in the magnetic damping parameter ($\alpha$) results in an increase in the switching probability. The closer a switching probability is to approaching 1, the more likely that the magnetized grains have switched to a desired state. As seen in the graph, the weaker head field, H=0.5T, had a substantial increase in switching probability as the magnetic damping parameter was increased above 0.075 and/or between about 0.075 to about 0.5. The switching probability for H=0.5T increased from 0.71 to approximately 0.97 for magnetic damping parameters ranging from about $0.01 \leq \alpha \leq 0.5$. Similarly, the stronger head field, H=1.0T, also had a significant increase in switching probability. The head field H=1.0T increased from 0.90 to nearly 1 for magnetic damping parameters ranging from about $0.01 \leq \alpha \leq 0.1$. As the magnetic damping parameter continued to increase to about $\alpha=0.3$, when H=1.0T the switching probability approaches 1. The graph illustrates how increasing $\alpha$ increases the switching probability for various head fields. For weaker head fields, such as H=0.5T, the increased magnetic damping parameters had a more substantial effect on increasing the switching probability.

Figure 9:
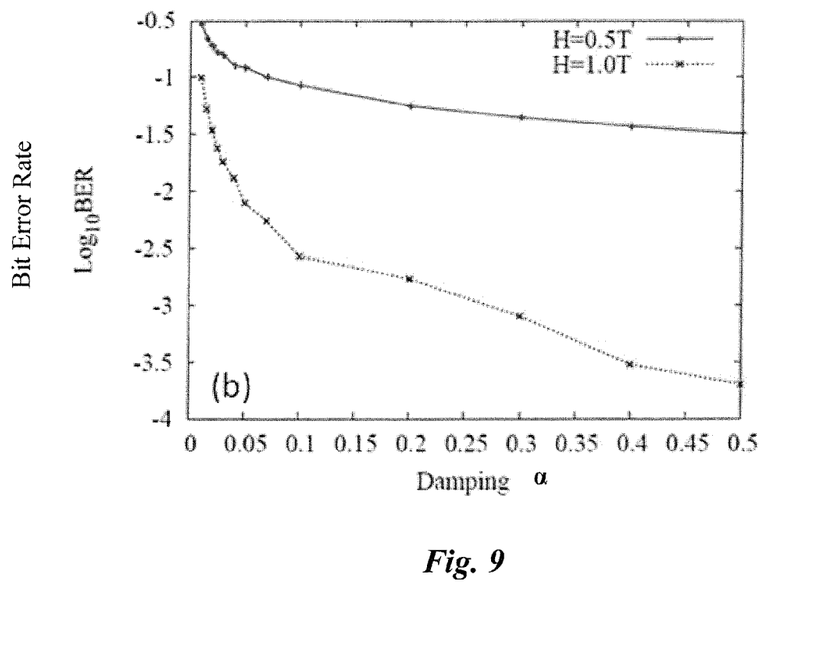
FIG. 9 is a graph showing bit error rate as a function of example magnetic damping parameters.

FIG. 9 is a graph showing bit error rate as a function of various magnetic damping parameters ($\alpha$) for magnetic head fields of 0.5T and 1.0T. The head fields were tested for a series of magnetic damping parameters ($\alpha$) ranging from about 0.01 to about 0.5. The graph in FIG. 9 shows how an increase in the magnetic damping parameter ($\alpha$) may result in a decrease of bit error rate. The bit error rate for the weaker head field, H=0.5T, decreased from about $10^{-0.5}$ to about $10^{-1.5}$ for magnetic damping parameters of $0.01 \leq \alpha \leq 0.5$. While the weaker head field H=0.5T showed a decrease in the bit error rate, the stronger head field H=1.0T showed a much more substantial decrease in bit error. The bit error rate for the stronger head field, H=1.0T, decreased from about $10^{-1}$ to about $10^{-3.7}$ for magnetic damping parameters of $0.01 \leq \alpha \leq 0.5$.

Figure 10A:
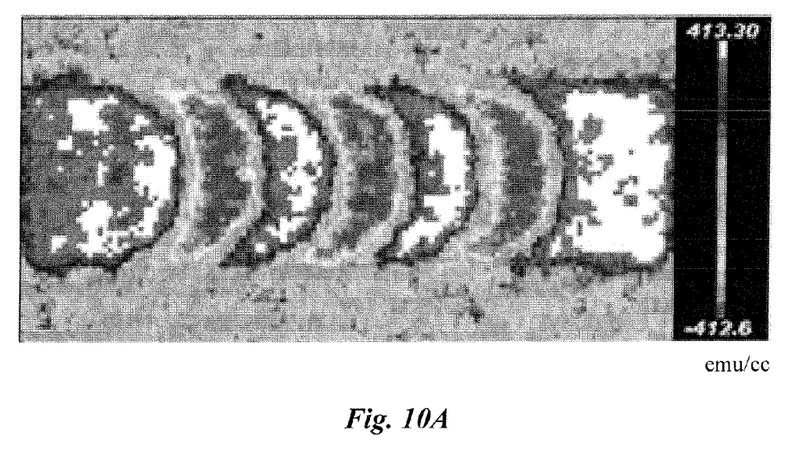
FIGS. 10A and 10B are a composite of simulations showing averaged magnetization of a 6-bit pattern for magnetic damping in accordance with some embodiments.
Figure 10B:
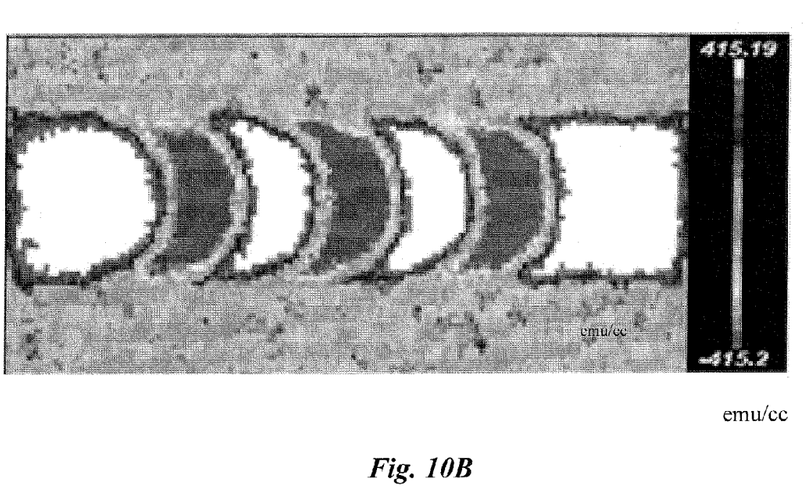

FIGS. 10A and 10B are a composite of simulation results showing an averaged magnetization of 6-bit patterns for magnetic damping in accordance with some embodiments. The LLB micromagnetic simulations create a visual graphic representing the impact of magnetic damping on a simulated recording layer. For each figure, a 6-bit transition pattern 1010101 written on FePt media was simulated 100 times for head field of 10 kOe and thermal gradient of 8K/nm. The gray scale shading of the transition pattern shows the local magnetization of each portion of the magnetic layer that corresponds to a bit. FIG. 10A represents a magnetic damping parameter of 0.2 and FIG. 10B represents a magnetic damping parameter of 0.6. Comparison of FIGS. 10A and 10B shows a noticeably noisier transition pattern in FIG. 10A. The more uniformly magnetized regions corresponding to the 1010101 pattern shown in FIG. 10B (as depicted by the more homogeneous white (corresponding to magnetization orientation 1) and gray regions (corresponding to magnetization orientation 0)) indicates a magnetization pattern with less noise. The simulations show that FIG. 10A, with the lower magnetic damping parameter, had a magnetization of about 80% while, FIG. 10B with the higher magnetic damping parameter had a magnetization of about 100%.

Figure 11:
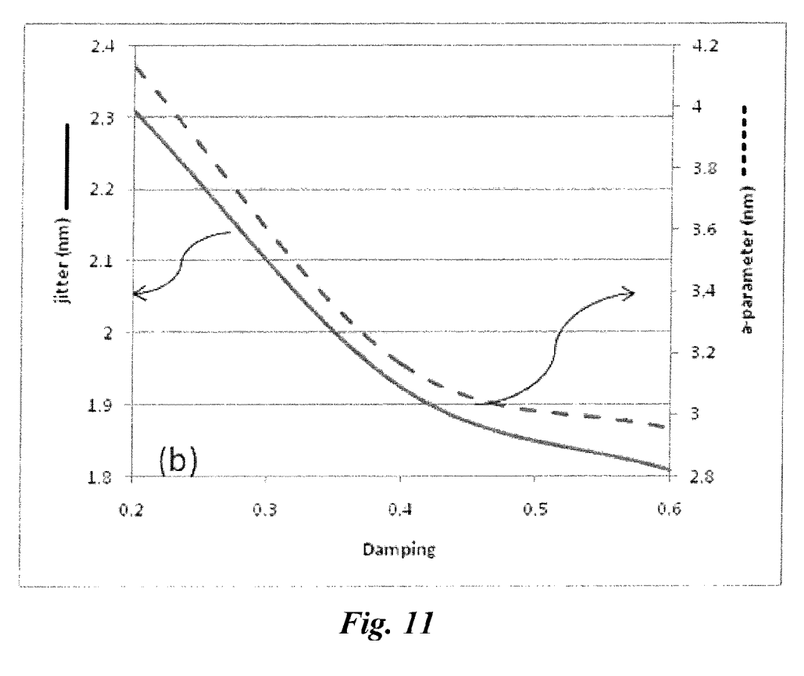
FIG. 11 is a graph showing jitter and a-parameter as a function of magnetic damping in accordance with some embodiments.

FIG. 11 is a graph showing transition jitter and a-parameter as a function of the magnetic damping value in accordance with some embodiments. Transition jitter is calculated from the standard deviation of the transition center position. The graph in FIG. 11 shows that a magnetic damping value in a range from about $0.2 \leq \alpha \leq 0.6$ reduces jitter from about 2.31 nm to about 1.81 nm. The jitter is reduced by over 20%, which also results in an approximately 20% increase in linear recording density. The graph also illustrates an a-parameter, which is the width of a bit transition. The a-parameter is a measurement that is proportional to jitter, but it is used to predict the locations of the recorded bits for optimal reading of the data.

Figure 12:
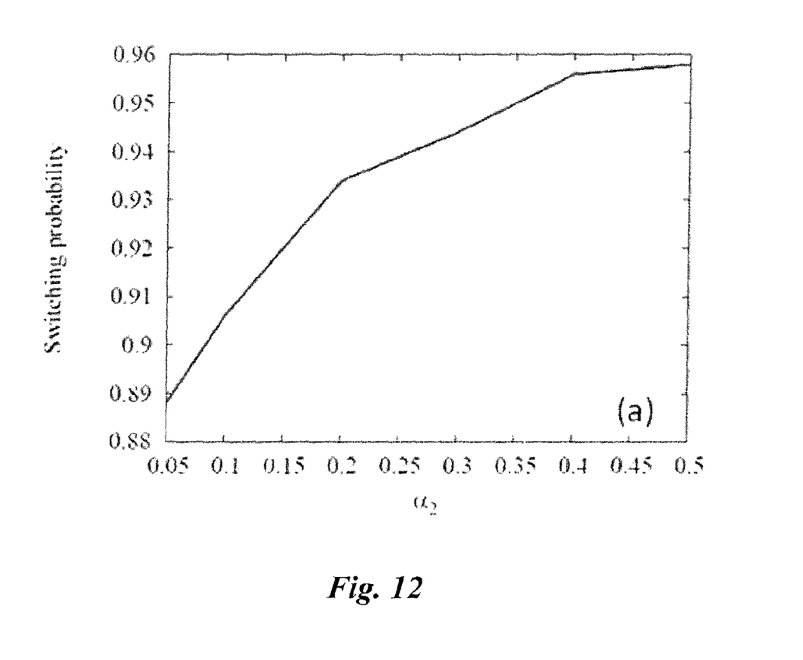
FIG. 12 is a graph showing switching probability versus varying magnetic damping parameters of a second layer in accordance with some embodiments.
Figure 13:
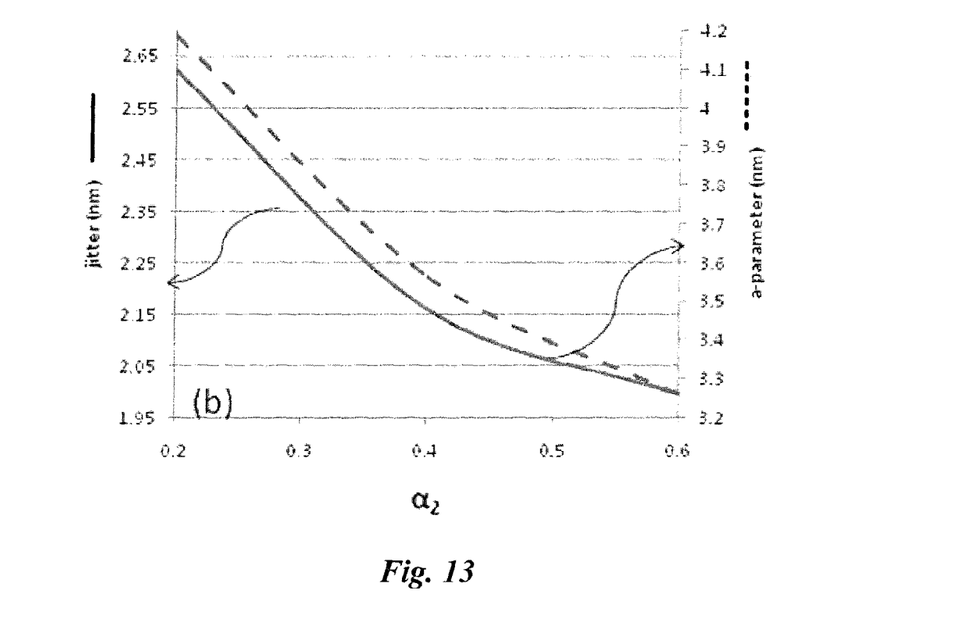
FIG. 13 is a graph showing jitter and a-parameter as a function of magnetic damping in the second layer from micromagnetic recording simulation in accordance with some embodiments.

Characteristics of the multi-layer structure (e.g., FIG. 4) are illustrated in FIGS. 12 and 13. The graphs are based on both macrospin modeling and micromagnetic recording simulation. The exchange coupling between the recording layers is assumed to be the bulk value $\alpha_2$.

FIG. 12 shows a graph of switching probability as a function of varying magnetic damping parameters of a multi-layer magnetic recording layer in accordance with some embodiments. The data points in this graph feature a multi-layer structure comprising a fixed magnetic damping parameter, $\alpha_1$, of a first sublayer and a varying magnetic damping parameter, $\alpha_2$, of a second sublayer. As shown in FIG. 12, the switching probability increases as the value of $\alpha_2$ increases. The response of the switching probability increasing with $\alpha_2$ suggests that the overall magnetic damping value of the entire multi-layer structure also increases with the $\alpha_2$.

FIG. 13 is a graph showing jitter and a-parameter as a function of magnetic damping in the second layer of a multi-layer magnetic recording layer in accordance with some embodiments. The data points in the graph of FIG. 13 also feature a multi-layer magnetic recording layer structure comprising a fixed magnetic damping parameter of a first sublayer and a varying magnetic damping parameter, $\alpha_2$, of a second sublayer. Based on the recording simulation a significant jitter reduction is observed in FIG. 13. The graph shows that a magnetic damping value of about $0.2 \leq \alpha \leq 0.6$ reduces jitter from about 2.62 nm to about 2.0 nm. The jitter is reduced by over 20%, which also results in an approximately 20% increase in linear recording density. The graph also illustrates an a-parameter, which is the width of a bit transition. The a-parameter is a measurement that is proportional to jitter, but it is used to predict the locations of the recorded bits for optimal reading of the data. Moreover, the multi-layer structure allows fine tuning of the overall magnetic damping value of the recording layer by changing the ratios of the magnetic damping values of the two sublayers. Tuning the damping value ratio of sublayers allows a more precise control for the overall magnetic damping value and magnetic properties to achieve optimal performance of the magnetic recording media.

This disclosure includes several numerical ranges that can be practiced throughout the disclosed numerical ranges. It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A magnetic stack, comprising:
a substrate; and
a magnetic recording layer disposed over the substrate and comprising:
a first magnetic recording sublayer having first anisotropy field, Hk1, and comprising first magnetic crystalline grains and a first segregant disposed between grain boundaries of the crystalline grains; and
a second magnetic recording sublayer including second magnetic crystalline grains and a second segregant disposed between grain boundaries of the second magnetic crystalline grains, the second magnetic recording sublayer having second anisotropy field, Hk2, where Hk1<Hk2, and the first magnetic recording sublayer is arranged between the second magnetic recording sublayer and the substrate in the magnetic stack,
wherein one or both of the first magnetic crystalline grains and the first segregant are doped with a rare earth or transition metal dopant in an amount that provides the magnetic recording layer with an overall damping value, α, between about 0.1 to about 1, and the amount of dopant varies as a function of distance along an axis normal to the surface of the magnetic recording layer.

2. The magnetic stack of claim 1, wherein a spacer layer is arranged between the first magnetic recording sublayer and the second magnetic recording sublayer.

3. The magnetic stack of claim 1, wherein the first magnetic recording sublayer has a first magnetic damping parameter value, $\alpha_1$, in a range of about 0.1 to about 1, and the second magnetic recording sublayer has a second magnetic damping parameter value, $\alpha_2$, in a range of about 0.01 to about 0.1 and the overall magnetic damping parameter value, α, of the magnetic recording structure is a function of $\alpha_1$ and $\alpha_2$.

4. The magnetic stack of claim 1, wherein:
the magnetic recording layer comprises N sublayers, 2≤N≤10, each of the N sublayers comprising:
magnetic crystalline grains; and
a segregant disposed at grain boundaries of the grains, wherein each of the N sublayers has a different magnetic damping parameter value.

5. The magnetic stack of claim 1, wherein:
at least one of the first magnetic crystalline grains and the first segregant are doped with a first type of dopant; and
at least one of the second magnetic crystalline grains and the second segregant are doped with a second type of dopant, different from the first type of dopant.

6. The magnetic stack of claim 1, wherein:
at least one of the first magnetic crystalline grains and the first segregant are doped with a dopant; and
at least one of the second magnetic crystalline grains and the second segregant are doped with the dopant, wherein an amount of the dopant in the first magnetic recording sublayer is different from an amount of the dopant in the second magnetic recording sublayer.

7. A magnetic stack, comprising:
a substrate; and
a magnetic recording layer disposed over the substrate and comprising:
a first magnetic recording sublayer comprising first magnetic crystalline grains and a first segregant disposed between grain boundaries of the crystalline grains; and
a second magnetic recording sublayer including second magnetic crystalline grains and a second segregant disposed between grain boundaries of the second magnetic crystalline grains,
wherein one or both of the first magnetic crystalline grains and the first segregant are doped with a rare earth or transition metal dopant in an amount that provides the magnetic recording layer with an overall damping value, α, between about 0.1 to about 1, and wherein a boundary thickness of the second segregant between adjacent second magnetic crystalline grains of the second magnetic recording sublayer provides a second damping parameter for the second magnetic recording sublayer between about 0.1 to about 1 and the second damping parameter contributes to the overall damping parameter of the magnetic recording layer.

8. The magnetic stack of claim 7, wherein the boundary thickness is greater than about 1.5 nm.

9. The magnetic stack of claim 7, wherein the boundary thickness is in a range of about 1.5 nm to about 3 nm.

10. The magnetic stack of claim 7, wherein at least one of the second magnetic crystalline grains and the second segregant are doped with a transition or rare earth element.

11. The magnetic stack of claim 7, wherein an anisotropy field, Hk1, of the magnetic recording layer is reduced by less than about 50% due to the doping compared to an anisotropy field of a similar magnetic recording layer without the rare earth or transition metal dopants.

12. The magnetic stack of claim 7, wherein the amount of the one or more dopants is up to about 10 at. %.

13. The magnetic stack of claim 7, wherein the one or more dopants comprise one or more 4d or 5d transition elements.

14. The magnetic stack of claim 13, wherein the one or more 4d or 5d transition elements comprise one or more of V, Mn, Zr, Nb, Mo, Ru, Rh, Ta, W, Re, Os, Ir.

15. The magnetic stack of claim 7, wherein the one or more dopants comprise one or more 4f rare earth elements.

16. The magnetic stack of claim 15, wherein the one or more 4f rare earth elements comprise one or more of Ho, Tb, Gd, Nd, Sm, Dy, Pr, Er, and Tm.

17. The magnetic stack of claim 7, wherein one or both of the first magnetic crystalline grains and the first segregant are doped with at least one of Ho, Tm, and Gd.

18. The magnetic stack of claim 7, further comprising:
a soft magnetic underlayer between the substrate and the magnetic recording layer;
a seedlayer between the soft magnetic underlayer and the magnetic recording layer;
a thermal control layer between the seedlayer and the magnetic recording layer; and
an overcoat layer over the magnetic recording layer.

19. The magnetic stack of claim 7, wherein a characterizes the dissipation rate of magnetic energy in the magnetic recording layer.

* * * * *